United States Patent [19]
Coddington et al.

[11] 3,769,122
[45] Oct. 30, 1973

[54] HALOGENATED BUTYL TUBELESS TIRE INNERLINER

[75] Inventors: David M. Coddington, Piscataway; William D. Marsh, Cranford, both of N.J.

[73] Assignee: Esso Research and Engineering Company, Linden, N.J.

[22] Filed: Apr. 27, 1971

[21] Appl. No.: 137,942

Related U.S. Application Data

[63] Continuation-in-part of Ser. No. 859,241, Sept. 2, 1969, abandoned, which is a continuation-in-part of Ser. No. 723,525, April 23, 1968, abandoned.

[52] U.S. Cl. .................. 156/115, 117/95, 152/347, 156/118, 252/72
[51] Int. Cl. ...................... B60c 21/08, B60c 21/04
[58] Field of Search .................... 156/115, 118, 121; 152/347; 117/95; 252/72

[56] References Cited
UNITED STATES PATENTS
2,879,823   3/1959   Smith .............................. 156/118 X
2,891,595   6/1959   Kuntz et al. ..................... 156/118 X

*Primary Examiner*—Edward G. Whitby
*Attorney*—Ernest V. Haines et al.

[57] ABSTRACT

Tubeless tire inner liners of butyl rubber or halobutyl rubber are formed by applying to the inner surfaces of such tire carcasses, either during their manufacture, or to previously made tires, i.e. new tire casings or used tire casings for retreading, a coating of the said rubber, as a sprayable, self-curing, or mild heat curing rubber cement, the rubber or blends of rubbers having a viscosity average molecular weight, in the case of a single rubber, or a calculated averaged viscosity average molecular weight, in the case of a blend of rubbers, of between about 28,000 and about 285,000, with the cement having a total solids content of between about 20 and about 80 wt. %, the remainder being organic solvent.

13 Claims, 1 Drawing Figure

HALOGENATED BUTYL TUBELESS TIRE INNERLINER

BACKGROUND

This application is a continuation-in-part of Ser. No 859,241, filed Sept. 2, 1969 now abandoned which is, in turn, a continuation-in-part of Ser. No. 723,525, filed Apr. 23, 1968 now abandoned.

The present invention relates to the provision of innerliners for tubeless tires, and more particularly to a process wherein an innerliner is applied in liquid cement form to the tubeless tire carcass before or after vulcanization and then cured under mild temperature or self curing conditions.

The innerliner, a thin gum sheet of rubber applied to the interior of a tubeless tire, is important to the operation of the tire because it minimizes air migration from the inflation chamber into the carcass body of the tire where it can produce pressure and oxidative effects which contribute to premature durability failure of the tire in service. The parameters which control the effectiveness of the innerliner in minimizing air migration are its air permeability (Q) and its gauge in the finished tire (X). Published studies have shown that in a given tire construction, the intracarcass pressure buildup is roughly a function of Q/X for the innerline.

The innerliner is conventionally applied to the unvulcanized tubeless tire as a compounded, dry rubber sheet, then cured into place in the tire molding operation. The curing cycle is lengthened significantly due to the heat barrier effect (incremental thickness) of the innerliner as compared to the tire with no innerliner in it. Furthermore, the forming pressure of the mold's interior bladder, acting against the nonuniform resistance of the various areas of the tire body to shaping, while the tire carcass and tread compounds and the innerliner are still thermoplastic, causes variable liner flow into the carcass cord area in the shoulders of the tire, resulting in nonuniform inner-liner gauge and, therefore, inefficient utilization of the inner-liner gauge orginally applied to the tire. Economics of manufacture and tire stability in operation dictate that it be constructed with the minimum practical "green" tire width (minimum available bead to bead tire section circumference) causing a tendency for the carcass cord to be pulled into the liner as it is forced out by the forming pressure of the mold bladder. In some situations these factors can produce extreme innerliner thinning (X very small) and effectively eliminate its air barrier function from the tire. The resultant intracarcass pressure and oxidative effects are major factors in premature durability failure of the tire.

An extension of current conventional tire curing practice involves the elimination of the curing bladder as a component of the mold and use of the actual tire interior to contain the steam and/or hot water which applies the heat and pressure to the inside of the tire for forming an vulcanization. "Bladderless" curing can have significant economic advantages due to elimination of the need to fabricate, stock and service bladders and improved heat transfer into the tire permitting shorter cures. On the other hand, it requires an interior surface in the uncured tire which can withstand the ravages of steam, etc., in direct contact and protect the interior structure of the tire (carcass, etc.) from moisture permeation.

Some tubeless tire innerliners are comprised of high unsaturation rubbers. These materials are easily adhered to the tire carcass, but do not produce an entirely satisfactory liner because their relatively high air diffusion permits significant intracarcass pressure buildup and oxidative effects. Another disadvantage to which they are subject is poor aging characteristics which results in loss of liner integrity as an air barrier by cracking. The search for a better liner led to chlorinated butyl rubber, a copolymer of isobutylene with small amounts of isoprene which contained reactive chlorine to the extent of 1–2 mole percent. Additionally the chlorinated butyl rubber generally required the incorporation of carbon black to impart the desired physical characteristics other than air impermeability To provide satisfactory processing, building tack and cured adhesion compatibility with the high unsaturation rubbers used in the adjacent parts of the tire, blends of chlorinated butyl with NR or SBR have been found effective. These compounds have been effective in improving innerliner air barrier performances and heat resistance and, consequently, tire durability. However, they are restricted to less than the full air barrier potential of an all-butyl compound by the amount of high unsaturation rubber present and are subject to the innerliner thinning and cure cycle lengthening described above.

SUMMARY

In accordance with the present invention, an innerliner comprised of essentially 85–100 percent, preferably 95–100 percent, most preferably 100 percent RHC halogenated butyl or regular butyl rubber, is applied to the inside of the tire as flowable or sprayable liquid cement either before or after molding and vulcanization of the tire. The thus applied innerliner is thereafter vulcanized at room or moderately elevated temperatures.

Curing or partial curing of the innerliner before the regular curing of the tire imparts dimensional stability which prevents the liner flow and thinning encountered with a conventional innerliner. Curing or partial curing of the innerliner or a thin overlay film over a conventional innerliner also provides a stable barrier against steam and hot water necessary for bladderless curing.

A thin overlay film could benefit conventional curing by enabling prevention of innerliner splice opening which sometimes occurs (during use of the tire) due to trapping of mold release coatings in the splice during cure. The overlay would be applied over the uncured splice ends before application of the release coating and would insulate the splice ends with a continuous barrier film against this entrapment of release coating.

Application and curing of the liquid cement innerliner after the regular vulcanization of the tire circumvents both the innerliner thinning and heat barrier (cure cycle increasing) problems associated with conventional innerliner application.

The innerliner material is a halogenated butyl or regular butyl rubber which has been compounded into a flowable or sprayable liquid so as to have the combined features of (1) flowability for application to the tire, (2) self-curing with no or little heat and (3) low gas permeability to function as an effective air barrier after application and curing. Both halogenated butyl (chlorobutyl or bromobutyl rubber) and regular butyl (nonhalogenated) rubber or blends thereof may be employed in this manner. The compounded formulation may contain minor amounts (up to 15 percent RHC) of high unsaturation rubbers in specific applications for adhesion.

The liquid cement innerliner is applicable to both new tubeless tire manufacture and to the sealing of the interior of used tire casings for retreading.

DESCRIPTION OF THE DRAWING

In the accompanying drawing, the single FIGURE is a radial cross section view of a pneumatic tire carcass made in accordance with the invention.

A tire 10 is shown mounted on a conventional rim 11. The tire body 12 is reinforced with cord layers 13 and 14 which extend around beads 15 and terminate on the exterior sidewalls of body 12 at ends 16 and 17. An improved low air permeability liner is depicted at 18. The liner 18 extends over the entire internal surface of the tire 10 and terminates preferably at bead toe 19. As has been stated before, this invention relates to an improved air-impervious liner that can be applied to the interior of the tire carcass before or after the tire has been completely vulcanized. In order to carry out this invention a new liner material is employed. The liner is composed of butyl or halogenated butyl rubber compounded so that it has the following novel features:

Figure 1:
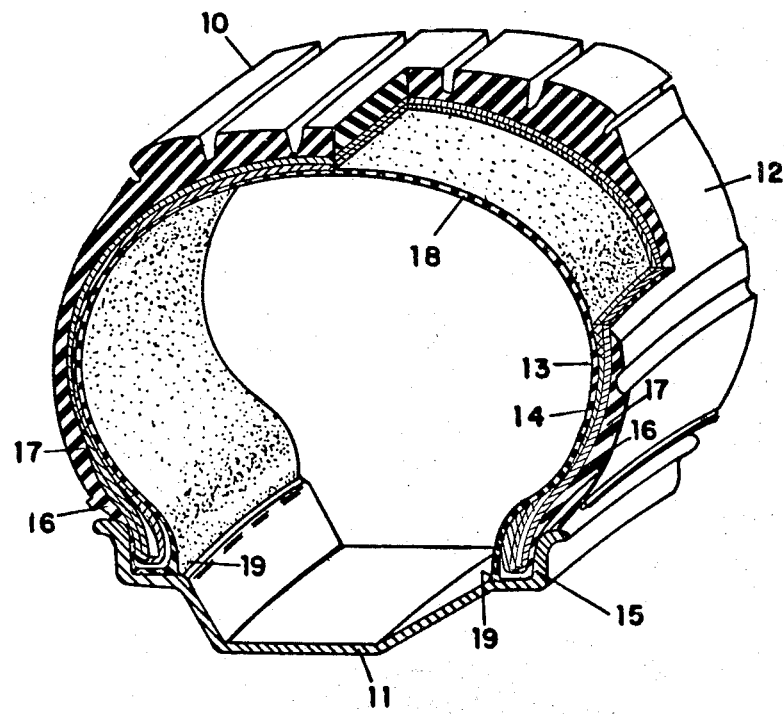

1. While it is applied in a liquid cement form it does in its final form develop a vulcanized state having elastomeric properties similar to the adjacent carcass compound through actual internal crosslinking.

2. It is applied in such a manner as to build up an effective membrane in terms of thickness and low gas permeability Whereas a conventional chlorobutyl/NR blend innerliner has a permeability coefficient Q = 0.5 – 0.75 (at room temperature) the system described herein has a Q = 0.20 – 0.25. Applying a model described in the literature for relating Q and gauge of the innerliner to tire intracarcass pressure leads to the conclusion that for the herein described liquid system a gauge of 0.012 inch is equivalent to a 0.030 – 0.040 inch gauge of conventional chlorobutyl blend innerliners. Thicknesses in the range of the 0.004 –0.015, preferably about 0.012 inch gauge are feasible for application of the liquid innerliner composition. When employed in retread casings, it not only seals cracks as the commercial materials are purported to, but forms a true innerliner in terms of the above factors where none may have previously been.

DESCRIPTION

Butyl rubber comprises a copolymer containing a major proportion, advantageously about 85–99.9 percent, preferably 95–99.5 percent, of a $C_4$ to $C_8$ isoolefin such as isobutylene, the remainder being a $C_4$ to $C_{10}$ multiolefin, preferably a $C_4$ to $C_6$ conjugated diolefin, such as butadiene, dimethyl butadiene, piperylene, alloocimene, or especially isoprene. The preparation of conventional butyl-type rubbers is described in U.S. Pat. No. 2,356,128. Polymers comprised of a major amount (85–99.9 percent) of a $C_4$ to $C_8$ isoolefin and more than one multiolefin species, are also considered to be butyl type elastomers.

The butyl rubber or halobutyl rubber component of the cement employed according to the present invention may be a single rubber as produced or it may be a blend of two or more rubbers commercially manufactured. There are several high molecular weight grades of butyl rubber commercially available. These have molecular weights of $\overline{M}_v$ (viscosity average molecular weight) of from about 300,000 to 450,000. Another specific butyl rubber only recently readily available, has a low molecular weight $\overline{M}_v$ of about 30,000. Similarly, chlorinated butyl rubber is available, on the open market, one grade of high molecular weight having an $\overline{M}_v$ of from 300,000 to 450,000, with the lower molecular weight grade of chlorobutyl rubber having an $\overline{M}_v$ of about 30,000. It is also possible, by controlling the process variables in the preparation of the butyl rubber, to produce butyl rubbers having an $\overline{M}_v$ of, for example, 100,000, 250,000 and the like. The process variables given rise to the differing $\overline{M}_v$ values of the butyl rubbers are generally arrived at by process variations in temperature; for example, a higher temperature generally results in lower molecular weight butyl rubbers and lower temperatures give rise to the higher molecular weight polymers. For example, carrying out the polymerization at a temperature of $-130°$ to $-140°F$. gives rise, all other conditions remaining constant, to a rubber having an $\overline{M}_v$ of 300,000 to 450,000, while if nothing else is altered in the process and the temperature is held at $-50°F.$, for example, the product will be a butyl rubber having an $\overline{M}_v$ of 30,000. Also, if the amount of isoprene to isobutylene is raised, a lower molecular weight product will result. The molecular weight can also be lowered by "poisoning" the reaction, such as, for example, introducing a very small amount of diisobutylene into the reaction chamber. These lower molecular weight butyl rubbers may be produced as described in U.S. Pat. No. 3,562,804 issued Jan. 9, 1971 and British Pat. No. 1,157,043 granted Oct. 29, 1969.

A single butyl rubber having an $\overline{M}_v$ within the range of between about 28,000 and 285,000 or blends of two or more butyl rubbers having calculated averaged molecular weights within this range may be employed. Also in compounding blends of butyl rubbers to give calculated averaged molecular weights within this range, still higher molecular weight butyl rubbers, i.e., higher than 285,000 molecular weight, and up to 450,000, may also be employed. It is not contemplated, however, to employ butyl rubbers or halobutyl rubbers, alone, whose molecular weights exceed 285,000. Such higher molecular weight rubbers can only be practically used in association with low molecular weight butyl or halobutyl rubbers. These low molecular weight rubbers are those havng an $\overline{M}_v$ of less than 285,000. For all practical purposes, butyl rubbers below about 28,000 $\overline{M}_v$ are not used because such materials are not suitable nor readily available.

The cement viscosity which lends itself most readily to being sprayed onto the inside of the tire casing and, which, at the same time, is sufficiently viscous to remain in place without excessive flowing will most generally be of about 40,000 cps or less but generally above 7,000 cps, when the cement has been freshly prepared, and will contain between about 20 and 80 wt. % total solids, including the carbon black filler and curatives added.

Viscosities outside of this centipoise range may also be used but generally within the range is most satisfactory. Viscosity measurements are determined by the method of ASTM-D-2196 using a Brookfield Viscometer with a number 4 spindle at 6 rpm and at 25°C. The present solids to produce the aforementioned sprayable cement viscosity generally varies inversely with the calculated averaged $\overline{M}_v$ of the halobutyl rubber. Generally, suitable cements are prepared containing a total of between about 20 and about 50 wt. % solids where the calcualted averaged $\overline{M}_v$ approaches toward 285,000 and between about 35 and about 80 wt. % solids where the calculated averaged $\overline{M}_v$ approaches toward 28,000. Similarly, a suitable cement having 30 to 55 wt. % solids could be prepared from butyl polymers having calculated averaged $\overline{M}_v$ of between about 30,000 and about 100,000. The end result sought is a balancing of the calculated averaged $\overline{M}_v$ of the butyl rubber or halobutyl rubber used with the weight percent total solids in the cement so as to obtain a cement composition whose viscosity is sufficiently low that it is readily sprayable on the inner surfaces of the tire but also whose viscosity is sufficiently high so that, once the coating is applied to the inner surfaces of the tubeless tire carcasses, it remains in place and necessitates no appreciable or substantial further treatment except for self-curing or curing under mild temperatures. All that is necessary is the use of the proper weight percent solids dictated by the calculated averaged $\overline{M}_v$ and the relative amounts of the rubber or rubbers employed. Other examples could be provided but these are representative of the types that are useful in practicing the present invention.

TABLE I

| Rubber Blends | | $\overline{M}_v$ | Amount wt.% | Caculated Averaged $\overline{M}_v$ |
|---|---|---|---|---|
| I | Chlorobutyl | 375,000 | 50) | 202,500 |
| | Chlorobutyl | 30,000 | 50) | |
| II | Butyl | 365,000 | 60) | 231,000 |
| | Butyl | 30,000 | 40) | |
| III | Chlorobutyl | 400,000 | 60) | 237,000 |
| | Chlorobutyl | 30,000 | 40) | |
| IV | Butyl | 250,000 | 50) | 175,000 |
| | Butyl | 100,000 | 50) | |
| V | Chlorobutyl | 250,000 | 60) | 162,000 |
| | Chlorobutyl | 30,000 | 40) | |
| VI | Butyl | 100,000 | 60) | 72,000 |
| | Butyl | 30,000 | 40) | |
| VII | Butyl | 450,000 | 30) | 156,000 |
| | Butyl | 30,000 | 70) | |

The chlorinated high molecular weight polymer contains at least 0.5, preferably at least 1.0 weight per cent combined chlorine, but not more than about 2 X weight percent and preferably not more than about X weight percent combined chlorine wherein $$X = \frac{35.46L}{(100-L)M_1 + L(M_2 + 35.46)} \times 100$$

and:

$L$ = Mole per cent of the multiolefin in the polymer
$M_1$ = Molecular weight of the isoolefin
$M_2$ = Molecular weight of the multiolefin
35.46 = Atomic weight of chlorine The above chlorinated butyl rubber is produced by reacting the unvulcanized butyl rubber with chlorine or chlorine-containing compounds so that the polymer contains at least 0.5 weight percent of combined chlorine but not more than about one atom of chlorine combined in the polymer per molecule of multiolefin present therein, i.e., not more than about one atom of combined chlorine per double bond in the polymer.

Suitable chlorinating agents which may be employed are molecular chlorine, alkali metal hypochlorites (preferably sodium hypochlorite), sulfur chlorides (particularly oxygenated sulfur chlorides), pyridinium chloride perchloride, N-chlorosuccinimide, and other common chlorinating agents. The preferred chlorinating agents are molecular chlorine and even more suitably, sulfuryl chloride. The chlorination is advantageously conducted at 0° to 100°C. and preferably at about 20° to 80°C. for about 1 minute to several hours. However, the temperatures and times are regulated to chlorinate the rubbery copolymer to the desired extent within the limits above mentioned.

The chlorination may be accomplished in various ways. One process comprises preparing a solution of the rubbery butyl copolymer in a suitable inert liquid organic solvent such as an inert hydrocarbon or advantageously halogenated derivatives of saturated hydrocarbon, examples of which are hexane, heptane, naphtha, kerosene, straight run mineral spirits, benzene, toluene, naphthalene, chlorobenzene, chloroform, trichloroethane, carbon tetrachloride, etc., and adding thereto the chlorine or other chlorinating agent, preferably in solution, such as dissolved in an alkyl chloride, carbon tetrachloride, etc. Other variations, which are not as preferred, comprise employing the chlorinating agent in the form of a gas, and contacting the gas with either a solution of the butyl copolymer or the solid copolymer per se. For example, if elemental chlorine is employed, it is most advantageously added in an alkyl chloride or carbon tetrachloride solution rather than in the gaseous state. The use of elevated or depressed pressures is optional since atmospheric pressure is satisfactory although the pressure may vary, depending upon the foregoing temperatures and times from about 1 to 400 psi.

The copolymer to be chlorinated is advantageously first dissolved in a solvent such as any of the foregoing, especially a saturated hydrocarbon or a completely chlorinated hydrocarbon. Particularly preferred solvents for specific chlorinating agents are as follows: carbon tetrachloride and/or chloroform for molecular chlorine, paraffinic hydrocarbons and/or carbon tetrachloride and/or aromatics such as benzene as non-polar solvents for chlorination with certain chlorinating agents, especially sulfuryl chloride. However, any of the above-listed chlorinating agents may be employed with an inert polar solvent for the rubbery copolymers providing the conditions of chlorination and amounts of the chlorinating agent are carefully controlled.

The low molecular weight polymer is a room temperature flowable (low bulk viscosity) halogenated or non-halogenated polymer. This composition is formed by the reaction of an isoolefin with a conjugated diolefin in a hydrocarbon diluent with a promoted or unpromoted aluminum compound based catalyst. The preferred low molecular weight copolymers have the following characteristics: (1) a narrow molecular weight distribution such that $\overline{M}_w/\overline{M}_n$ ratio of the polymers as determined by gel permeation chromatography (GPC) is about 4.0 and (2) a number average molecular weight ($\overline{M}_n$ as determined from GPC data of at least 5,000).

These copolymers can be chlorinated or brominated to render them more amenable to curing. Preferably the halogenated polymers contain from 1 to 7 weight percent of chlorine or from 2 to 14 weight percent bromine.

The butyl elastomers described above are either alone or in blends compounded with carbon black or other fillers, curatives and other ingredients and incorporated into a suitable solvent i.e. any of those previously set forth herein as the organic solvent for carrying out the chlorinated reaction in solution, such as toluene or a blend of solvents formulated to provide specific solvency and/or drying characteristics, to make a cement containing 20–80 percent solids by weight. The chlorobutyl is itself either the high molecular weight polymer ($\overline{M}_v \approx 375,000$) or low molecular weight polymer ($\overline{M}_v = 30,000$) or a blend of these two basic types so as to provide a workable balance of low solution viscosity (less than 40,000 cps but generally above 7,000 cps) for application and final vulcanizate physical properites. The innerliner is formulated to cure at room or only slightly elevated temperature. A typical compounding recipe is as follows:

| Component | COMPOSITION A | B |
|---|---|---|
| High MW Chlorinated butyl, $\overline{M}_v \approx 375,000$; 1% wt. Cl. | 50 | 50 |
| Low MW Chlorinated butyl, $\overline{M}_v \approx 30,000$; 2–5% wt. Cl. | 50 | 50 |
| HAF Black | 50 | 50 |
| Stearic Acid | 1 | 1 |
| Zinc Oxide | 5 | 5 |
| GMF* | 4 | — |
| PbO$_2$ | — | 8 |
| Sulfur | 1 | 1 |

*GMF — paraquinone dioxime

The blend of polymers in Compositions A and B have a calculated average $\overline{M}_v$ of about 202,500. Compositions A and B are mixed separately in conventional Banbury mixing equipment taking care to add the ZnO at the end of the mix and at a temperature below 250°F. since it is a curative for the chlorinated butyl. The two compositions are then dissolved in cement form separately in toluene to about 45 solids wt. % concentration and then blended on equal parts basis just prior to use. The split batch approach employed with this recipe is conventional practice for room temperature (self) curing systems.

A second formulation illustrating the use of nonchlorinated butyls is shown below:

| Component | Composition A | B |
|---|---|---|
| High MW Butyl ($\overline{M}_v \approx 350,000$) | 60 | — |
| Low MW Butyl ($\overline{M}_v \approx 30,000$) | 40 | — |
| HAF Black | 50 | — |
| MT Black | 25 | — |
| SRF Black | 25 | — |
| Tung Oil | 5 | — |
| GMF* | 2.5 | — |
| C-5 Paste (50% PbO$_2$) | — | 15 |

*Paraquinone dioxime

Composition A having a blend of polymers with a calculated averaged $\overline{M}_v$ of about 222,000, is mixed together in a conventional paint milling operation. The polymers are first solvated in toluene. The dry ingredients are then stirred into the solution and the resulting mass is passed through a paint mill 5–10 times. The solvent level is then adjusted to a 30 wt. % total solids in toluene. Component B is stirred into Composition A in the proper ratio just prior to use.

Still a further formulation, not involving a blend of high and low molecular weight butyl rubbers, is illustrated as follows:

| Component | Composition C |
|---|---|
| Low MW Butyl ($\overline{M}_v \approx 30,000$) | 100 |
| MT Carbon Black | 100 |
| HAF Black | 30 |
| GMF | 3.5 |

To this composition, in toluene, at 50 wt. % total solids concentration, and after thorough mixing, 10 parts of C-5 paste (50% PbO$_2$) is added and mixed, as a curative, just prior to coating the composition, by spraying, on the entire inner surface of a tubeless tire carcass. This technique, using this self-curable composition, results in an air impermeable layer of butyl rubber of about 0.014 inches thickness secured firmly to the inner surface of the tire carcass after the toluene has evaporated from the sprayed composition.

A preferred cement composition is as follows:

| Component | Composition D |
|---|---|
| High MW Butyl ($\overline{M}_v \approx 365,000$) | 60 |
| Low MW Butyl ($\overline{M}_v \approx 30,000$) | 40 |
| HAF Carbon Black | 50 |
| SRF Carbon Black | 25 |
| MT Carbon Black | 25 |
| Tung Oil | 5 |
| GMF | 2.5 |

The blend of polymers in this composition has a calculated average $\overline{M}_v$ of about 231,000. To this mixed cement composition, at 30 wt. % solids, in toluene, there is added just before mixing and spraying, 10 parts of C-5 paste (50 percent PbO$_2$).

The use of the LM halogenated butyl or unhalogenated LM butyl is believed to be novel.

Tires embodying the butyl type liquid innerliner concept have shown significantly improved wheel durability test performance over controls as shown by the following example. The test employed a group of nonlined (tube type) tires of the same size and construction, procured from a commercial outlet. The liquid innerliner compositions were applied by a spraying technique. The tires were run without innertubes on a tread separation tester employing a 11.2 inch diameter road wheel. Speed, inflation, load conditions and test results are summarized below:

WHEEL DURABILITY TEST RESULTS

Tire Construction: Commercial Production, 8.15x15 4 ply nylon, tube type.
Inflation pressure, p.s.i.g.: 32 cold; 40 running.
Axle load, lbs.: 1185.
Speed, mph.: 40.

| Group | Liner | Liner gauge (inch) | Average failure mileage | No. of tires | ICP* (p.s.i.g.) |
|---|---|---|---|---|---|
| Control | None | | 2523 | 4 | 16.8 |
| 1 | 50 high MW chlorobutyl ($\overline{M}_v \approx 375,000$), 50 low MW chlorobutyl ($\overline{M}_v \approx 30,000$), Cure A. | .014 | 5121 | 4 | 11.4 |
| 2 | 50 high MW chlorobutyl ($\overline{M}_v \approx 375,000$), 50 low MW chlorobutyl ($\overline{M}_v \approx 30,000$), Cure B. | .015 | 4426 | 4 | 12.2 |

*Static intracarcass pressure buildup.

The liquid liner composition in Group 1 was the chlorinated butyl composition presented above. The Group 2 liner used a ZnCl$_2$ curative system rather than the GMF, PbO$_2$ system. The significantly improved durability performance of the Group 1 and 2 tires and their reduced static intracarcass pressure relative to the control attest to the effectiveness of the liquid innerliner as a barrier to carcass pressure buildup.

What is claimed is:

1. A method of forming a tubeless pneumatic tire innerliner which comprises applying to the entire inner surface of its tire carcass, a continuous, sprayable, self-curable rubber cement coating of butyl rubber or halogenated butyl rubber having a viscosity average molecular weight between about 28,000 and about 285,000, and having fillers and curatives to a total solids content of between about 20 and about 80 percent by weight.

2. A method as in claim 1 wherein the cement is a butyl rubber cement.

3. A method as in claim 2 wherein a blend of butyl rubbers is employed, one being of high molecular weight and another being of low molecular weight, and wherein the calculated averaged viscosity average molecular weight of the butyl rubber blend is between about 28,000 and about 285,000.

4. A method as in claim 1 wherein the cement is a halobutyl rubber cement.

5. A method as in claim 4 wherein a blend of halobutyl rubbers is employed, one being of high molecular weight and another being of low molecular weight, and wherein the calculated averaged viscosity average molecular weight of the halobutyl rubber blend is between about 28,000 and about 285,000.

6. A method as in claim 4 wherein the halobutyl rubber is chlorobutyl rubber.

7. A method as in claim 5 wherein the halobutyl rubbers are chlorobutyl rubbers.

8. A method as in claim 3 wherein the blend of rubbers is about 60 percent of butyl rubber having an $\overline{M}_v$ of about 365,000 and about 40 percent of butyl rubber having an $\overline{M}_v$ of about 30,000, with a total solids content in toluene of about 30 wt. %, and containing carbon black as a filler.

9. A method as in claim 2 wherein the rubber in the cement is butyl rubber of about 30,000 $\overline{M}_v$ and the cement contains carbon black as a filler, and curatives, and has a total solids content of about 50 wt. % in toluene.

10. A tubeless pneumatic tire containing over its entire inner surface, a self-cured continuous innerliner formed by spraying the said inner surface with a sprayable cement coating composition of butyl rubber or halobutyl rubber having a viscosity average molecular weight between about 28,000 and about 285,000 containing fillers and curatives to a total solids content of between about 20 and about 80 percent by weight.

11. A tubeless pneumatic tire as in claim 10 wherein the coating composition is a blend of butyl or halobutyl rubbers, one being of high molecular weight and another being of low molecular weight, and wherein the calculated averaged viscosity average molecular weight of the rubber blend is between about 28,000 and about 285,000.

12. A tubeless pneumatic tire as in claim 11 wherein the rubber blend is a blend of butyl rubbers, one being of about 365,000 $\overline{M}_v$ in the amount of 60 percent, and the other being of about 30,000 $\overline{M}_v$ in the amount of about 40 percent and with carbon black as a filler.

13. A tubeless pneumatic tire as in claim 11, wherein the rubber is butyl rubber of about 30,000 $\overline{M}_v$, and with carbon black as a filler.

* * * * *